United States Patent
Nam et al.

(10) Patent No.: US 12,068,831 B2
(45) Date of Patent: Aug. 20, 2024

(54) BEAM FAILURE RECOVERY OPERATION FOR DISCONTINUOUS RECEPTION MODE

(71) Applicant: QUALCOMM Incorporated, San Diego, CA (US)

(72) Inventors: Wooseok Nam, San Diego, CA (US); Linhai He, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 17/449,048

(22) Filed: Sep. 27, 2021

(65) Prior Publication Data

US 2022/0109488 A1  Apr. 7, 2022

Related U.S. Application Data

(60) Provisional application No. 63/087,007, filed on Oct. 2, 2020.

(51) Int. Cl.
*H04B 7/08* (2006.01)
*H04W 52/02* (2009.01)
(Continued)

(52) U.S. Cl.
CPC ........ *H04B 7/088* (2013.01); *H04W 52/0232* (2013.01); *H04W 74/04* (2013.01); *H04W 74/0833* (2013.01); *H04W 76/19* (2018.02)

(58) Field of Classification Search
None
See application file for complete search history.

(56) References Cited

U.S. PATENT DOCUMENTS

| 2019/0387470 A1 | 12/2019 | Nam et al. |
| 2020/0037388 A1 | 1/2020 | Nam et al. |

(Continued)

FOREIGN PATENT DOCUMENTS

| WO | WO-2019135654 A1 | 7/2019 |
| WO | WO-2022038576 A1 * | 2/2022 |

OTHER PUBLICATIONS

International Search Report and Written Opinion—PCT/US2021/071620—ISA/EPO—Jan. 27, 2022.

(Continued)

*Primary Examiner* — Saumit Shah
(74) *Attorney, Agent, or Firm* — Norton Rose Fullbright US LLP

(57) ABSTRACT

Techniques to enable and provide beam failure recovery (BFR) operation for discontinuous reception (DRX) modes with wakeup signal (WUS) monitoring are described. DRX mode operation may be altered based on a BFR procedure implemented by a user equipment (UE). DRX mode operation may be altered for allowing a UE to start a DRX active time after transmitting a BFR request signal of a BFR procedure. Additionally or alternatively, DRX mode operation may be altered for allowing a UE to start an ON duration timer for a next DRX cycle after transmitting a BFR request signal of a BFR procedure. In another example, DRX mode operation may be altered for allowing a UE to monitor a BFR search space set regardless of DRX status, after transmitting a BFR request signal for a BFR procedure. Other aspects and features are also claimed and described.

26 Claims, 6 Drawing Sheets

(51) Int. Cl.
*H04W 74/04* (2009.01)
*H04W 74/0833* (2024.01)
*H04W 76/19* (2018.01)

(56) References Cited

U.S. PATENT DOCUMENTS

| | | | |
|---|---|---|---|
| 2020/0137821 A1 | 4/2020 | Cirik et al. | |
| 2021/0068162 A1* | 3/2021 | Agiwal | H04B 7/0617 |
| 2021/0105827 A1* | 4/2021 | Tsai | H04W 74/0833 |
| 2022/0312325 A1* | 9/2022 | Turtinen | H04W 76/28 |

OTHER PUBLICATIONS

Mediatek Inc: "Summary #2 on Remaing Issues on Beam Failure Recovery", 3GPP TSG RAN WG1 Meeting #94, 3GPP Draft, R1-1809926_Summary_BFR_V05, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 20, 2018-Aug. 24, 2018, Aug. 23, 2018 (Aug. 23, 2018), 30 Pages, XP051517280, Retrieved from the Internet: URL: https://www.3gpp.org/ftp/TSG_RAN/WG1_RL1/TSGR1_94/Docs/R1-1809926.zip, [retrieved on Aug. 23, 2018], 3.10.

* cited by examiner

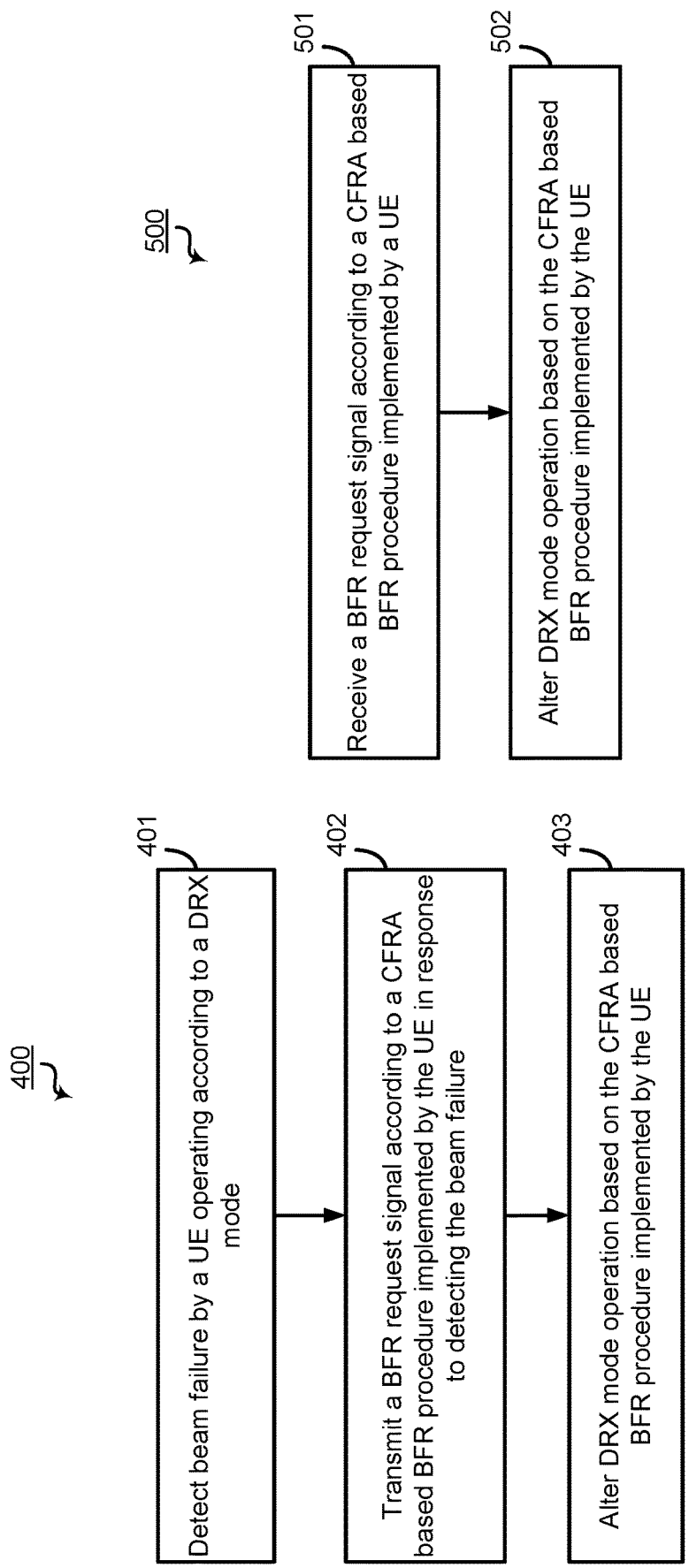

BEAM FAILURE RECOVERY OPERATION FOR DISCONTINUOUS RECEPTION MODE

CROSS-REFERENCE TO RELATED APPLICATIONS

This application claims the benefit of U.S. Provisional Patent Application No. 63/087,007, entitled, "BEAM FAILURE RECOVERY OPERATION FOR DISCONTINUOUS RECEPTION MODE WITH WAKEUP SIGNAL MONITORING," filed on Oct. 2, 2020, which is expressly incorporated by reference herein in its entirety.

TECHNICAL FIELD

Aspects of the present disclosure relate generally to wireless communication systems, and more particularly, to beam failure recovery (BFR) operation. Certain embodiments of the technology discussed below can enable and provide BFR operation for discontinuous reception (DRX) modes with wakeup signal (WUS) monitoring.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

As UE get smaller and the services offered thereon grow, the real estate for hardware within the UE becomes more and more scarce and expensive. Users also desire that their UE have increased battery life. While the obvious solution to increasing battery life is to include a larger battery that stores more energy, such a solution is limited by the aforementioned real estate issues. As such, rather than increasing battery life by via battery size and storage capacity, the industry has implemented operational modes which attempt to increase battery life by reducing the UE's power consumption. Using such techniques, a battery of the same storage capacity is capable of lasting longer because less of the stored energy is being used.

An example of an operational mode which attempts to reduce UE power consumption is a discontinuous reception (DRX) mode. In operation according to a DRX mode, a UE enters into sleep mode for a certain period of time and wakes up for another period of time where the UE monitors physical downlink control channel (PDCCH) during a specified active duration every DRX cycle. For example, according to a two-mode DRX mode, while in radio resource control (RRC) idle mode of DRX operation (known as DRX in RRC idle or I-DRX), the UE operates to monitor PDCCH discontinuously (e.g., the UE monitors P-RNTI (paging radio network temporary identifier) in PDCCH, at predetermined periods, such as every 640 ms or 1280 ms) to reduce UE power consumption. In contrast to I-DRX mode which is mainly designed for page monitoring and optimized for reception only operation, connected DRX (C-DRX) mode is designed for a RRC connection between the UE and base station where the UE is expected to receive and transmit. In C-DRX mode operation, even if the traffic is downlink mobile termination (MT) data, the UE needs to transmit in the uplink to facilitate control signaling of data, such as feedback acknowledgement for the decoded data. Accordingly, the C-DRX mode provides an "ON duration" wherein the UE is operable to receive and transmit and in which the UE monitors the PDCCH.

A UE's state information (such as timing synchronization and information about the radio channel) may become outdated during sleep time. Thus, the UE may perform operations such as automatic gain control (AGC), time tracking loops (TTL), frequency tracking loops (FTL), channel estimation, etc., when it exits the sleep state and performs a wake up (WU) process to transition into C-DRX mode. Such a WU process consumes a significant amount of power. Performing the WU process according to schedule at a time when no data is actually being received is a waste of power consumption and shortens the battery life unnecessarily. Accordingly, a UE may be configured for wakeup signal (WUS) monitoring in association with DRX mode operation. Using such WUS monitoring, whether the UE wakes up (e.g., WU stage operation is performed) for the ON duration is conditional on the detection of a WUS. The use of a WUS may thus avoid performing the WU process when no data is actually to be received by the UE.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication is provided. The method may include detecting a beam failure by a user equipment (UE) operating according to a discontinuous reception (DRX) mode and transmitting a beam failure recovery (BFR) request signal according to a contention-free random access (CFRA) based BFR procedure implemented by the UE in response to detecting the beam failure. The method may also include altering DRX mode operation based on the CFRA based BFR procedure implemented by the UE.

In an additional aspect of the disclosure, an apparatus for wireless communication is provided. The apparatus may include means for detecting a beam failure by a UE operating according to a DRX mode and means for transmitting a BFR request signal according to a CFRA based BFR procedure implemented by the UE in response to detecting the beam failure. The apparatus may also include means for altering DRX mode operation based on the CFRA based BFR procedure implemented by the UE.

In an additional aspect of the disclosure, a non-transitory computer-readable medium having program code recorded thereon for wireless communication is provided. The program code may include code to detect a beam failure by a UE operating according to a DRX mode and code to transmit a BFR request signal according to a CFRA based BFR procedure implemented by the UE in response to detecting the beam failure. The program code may also include code to alter DRX mode operation based on the CFRA based BFR procedure implemented by the UE.

In an additional aspect of the disclosure, an apparatus configured for wireless communication is provided. The apparatus includes at least one processor, and a memory coupled to the processor. The processor may be configured to detect a beam failure by a UE operating according to a DRX mode and to transmit a BFR request signal according to a CFRA based BFR procedure implemented by the UE in response to detecting the beam failure. The processor may also be configured to alter DRX mode operation based on the CFRA based BFR procedure implemented by the UE.

In some examples of the method, the apparatuses, and the article including non-transitory computer-readable medium described herein, the BFR request signal includes a random access channel (RACH) preamble and an associated message of the CFRA based BFR procedure.

In some examples of the method, the apparatuses, and the article including non-transitory computer-readable medium described herein, the altering DRX mode operation includes starting a DRX active time.

In some examples of the method, the apparatuses, and the article including non-transitory computer-readable medium described herein, the starting the DRX active time includes triggering a DRX timer based upon the UE receiving a physical downlink control channel (PDCCH) scheduling medium access control (MAC) protocol data unit (PDU) according to the CFRA based BFR procedure whether or not the UE is operating within an active time of the DRX mode at a time of the UE receiving the PDCCH scheduling MAC PDU.

In some examples of the method, the apparatuses, and the article including non-transitory computer-readable medium described herein, the DRX timer includes one or more timers selected from an inactivity timer, a round trip time (RTT) timer, and a retransmission timer.

In some examples of the method, the apparatuses, and the article including non-transitory computer-readable medium described herein, the DRX active time includes an active time of the DRX mode defined to include activity of the BFR procedure by the UE.

In some examples of the method, the apparatuses, and the article including non-transitory computer-readable medium described herein, the DRX mode is a wake-up signal (WUS) triggered DRX mode.

In some examples of the method, the apparatuses, and the article including non-transitory computer-readable medium described herein, the altering DRX mode operation includes monitoring the WUS in a BFR search space set at least for a next DRX cycle after transmission of the BFR request signal by the UE.

In some examples of the method, the apparatuses, and the article including non-transitory computer-readable medium described herein, the altering DRX mode operation includes altering a spatial filter used for receiving the WUS at least for a next DRX cycle after transmission of the BFR request signal by the UE.

In some examples of the method, the apparatuses, and the article including non-transitory computer-readable medium described herein, the altering a spatial filter used for receiving the WUS includes using a quasi-colocation (QCL) assumption of a candidate beam of the CFRA based BFR procedure for the spatial filter used for receiving the WUS.

In some examples of the method, the apparatuses, and the article including non-transitory computer-readable medium described herein, the altering a spatial filter used for receiving the WUS includes using a second resource configuration for the WUS, wherein the second resource configuration for the WUS is different from a first WUS resource configuration used prior to detecting the beam failure.

In some examples of the method, the apparatuses, and the article including non-transitory computer-readable medium described herein, the second resource configuration for the WUS includes at least one of a control resource set, a search space set, or a downlink control information format.

In some examples of the method, the apparatuses, and the article including non-transitory computer-readable medium described herein, the search space set for the WUS is the same as a BFR search space set associated with the CFRA based BFR procedure.

In some examples of the method, the apparatuses, and the article including non-transitory computer-readable medium described herein, the altering DRX mode operation includes assuming non-WUS triggered DRX mode operation in which the next DRX cycle after transmission of the BFR request signal is initiated with or without the UE receiving the WUS.

In some examples of the method, the apparatuses, and the article including non-transitory computer-readable medium described herein, the altering DRX mode operation includes monitoring a BFR search space set by the UE after transmitting the BFR request signal whether or not the UE is operating within an active time of the DRX mode.

In some examples of the method, the apparatuses, and the article including non-transitory computer-readable medium described herein, the monitoring the BFR search space set by the UE after transmitting the BFR request signal includes monitoring the BFR search space set by the UE whether or not the UE is operating within a random access response (RAR) window of the CFRA based BFR procedure.

In one aspect of the disclosure, a method of wireless communication is provided. The method may include receiving a BFR request signal according to a CFRA based BFR procedure implemented by a UE. The BFR request signal may be provided in association with the beam failure detected by the UE operating according to a WUS triggered DRX mode. The method may also include altering DRX mode operation based on the CFRA based BFR procedure implemented by the UE.

In an additional aspect of the disclosure, an apparatus for wireless communication is provided. The apparatus may include means for receiving a BFR request signal according to a CFRA based BFR procedure implemented by a UE. The BFR request signal may be provided in association with the beam failure detected by the UE operating according to a WUS triggered DRX mode. The apparatus may also include altering DRX mode operation based on the CFRA based BFR procedure implemented by the UE.

In an additional aspect of the disclosure, a non-transitory computer-readable medium having program code recorded thereon for wireless communication is provided. The program code may include code to receive a BFR request signal according to a CFRA based BFR procedure implemented by a UE. The BFR request signal may be provided in association with the beam failure detected by the UE operating according to a WUS triggered DRX mode. The program code may also include code to alter DRX mode operation based on the CFRA based BFR procedure implemented by the UE.

In an additional aspect of the disclosure, an apparatus configured for wireless communication is provided. The apparatus includes at least one processor, and a memory coupled to the processor. The processor may be configured to receive a BFR request signal according to a CFRA based BFR procedure implemented by a UE. The BFR request signal may be provided in association with the beam failure detected by the UE operating according to a WUS triggered DRX mode. The processor may also be configured to alter DRX mode operation based on the CFRA based BFR procedure implemented by the UE.

In some examples of the method, the apparatuses, and the article including non-transitory computer-readable medium described herein, the altering DRX mode operation includes altering a spatial filter used the WUS at least for a next DRX cycle after receiving the BFR request signal.

In some examples of the method, the apparatuses, and the article including non-transitory computer-readable medium described herein, the altering a spatial filter used for the WUS includes using a QCL assumption of a candidate beam of the CFRA based BFR procedure for the spatial filter used for receiving the WUS.

In some examples of the method, the apparatuses, and the article including non-transitory computer-readable medium described herein, the altering a spatial filter used for the WUS includes using a second resource configuration for the WUS, wherein the second resource configuration for the WUS is different from a first WUS resource configuration used prior to detecting the beam failure.

In some examples of the method, the apparatuses, and the article including non-transitory computer-readable medium described herein, the second resource configuration for the WUS includes at least one of a control resource set, a search space set, or a downlink control information format.

In some examples of the method, the apparatuses, and the article including non-transitory computer-readable medium described herein, the search space set for the WUS is the same as a BFR search space set associated with the CFRA based BFR procedure.

Other aspects, features, and embodiments will become apparent to those of ordinary skill in the art, upon reviewing the following description of specific, exemplary embodiments in conjunction with the accompanying figures. While features may be discussed relative to certain aspects and figures below, all embodiments can include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 4 is a block diagram illustrating a flow providing operation by a user equipment (UE) for BFR operation for DRX modes with WUS monitoring according to some embodiments of the present disclosure.

FIG. 5 is a block diagram illustrating a flow providing operation by a base station for facilitating BFR operation for DRX modes with WUS monitoring according to some embodiments of the present disclosure.

DETAILED DESCRIPTION

Figure 1:
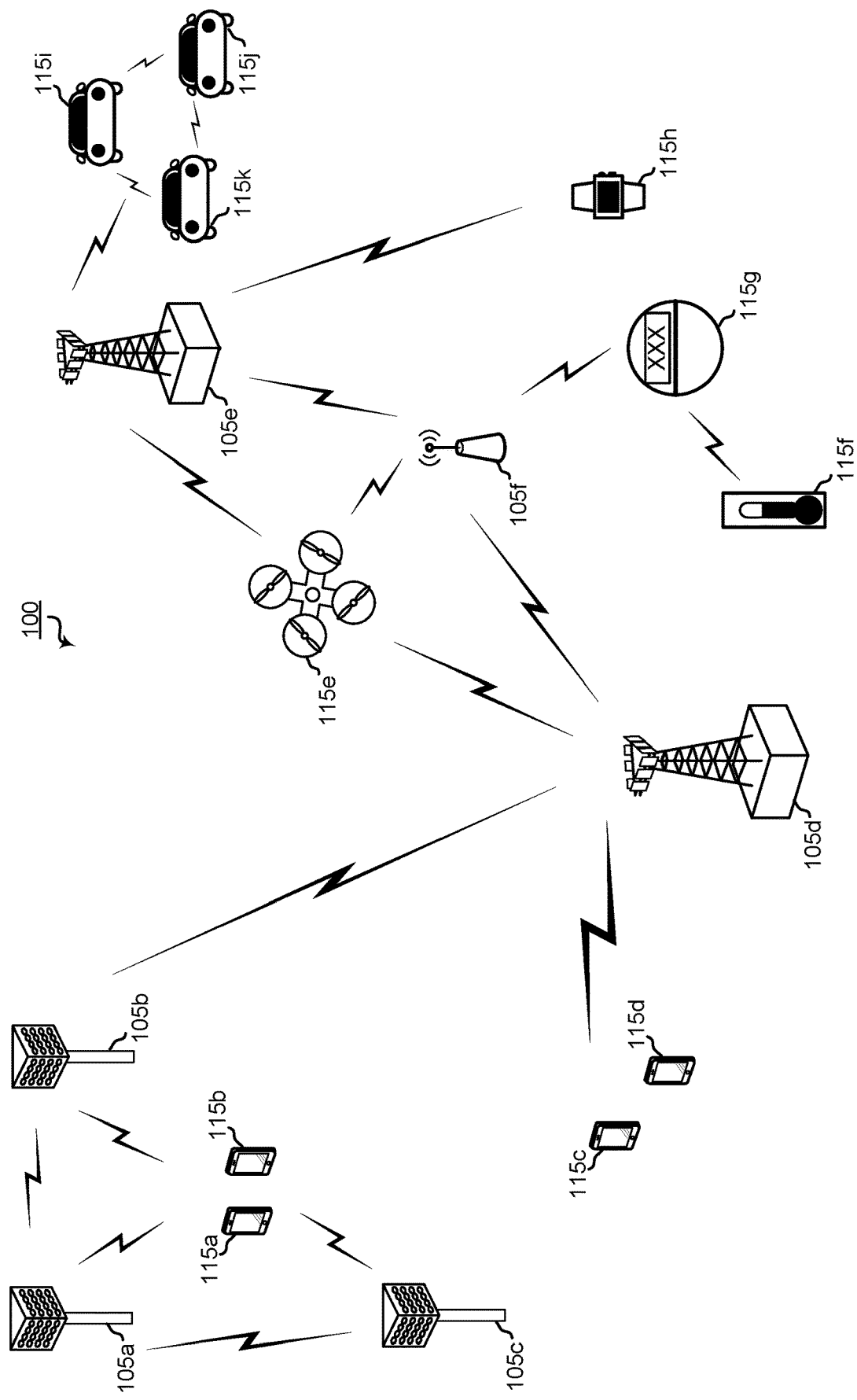
FIG. 1 is a block diagram illustrating details of a wireless communication system according to some embodiments of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The Third Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. Additionally, an operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects descried with reference to one technology may be understood to be applicable to another technology. Indeed, one or more aspects of the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km2), extreme data rates (e.g., multi-Gbps rate, 100+ Mbps user experienced rates), and deep awareness with advanced discovery and optimizations.

Base stations 105 and UEs 115 may be configured to communicate via one or more portions of the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "mmWave" band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 is a block diagram illustrating details of an example wireless communication system. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
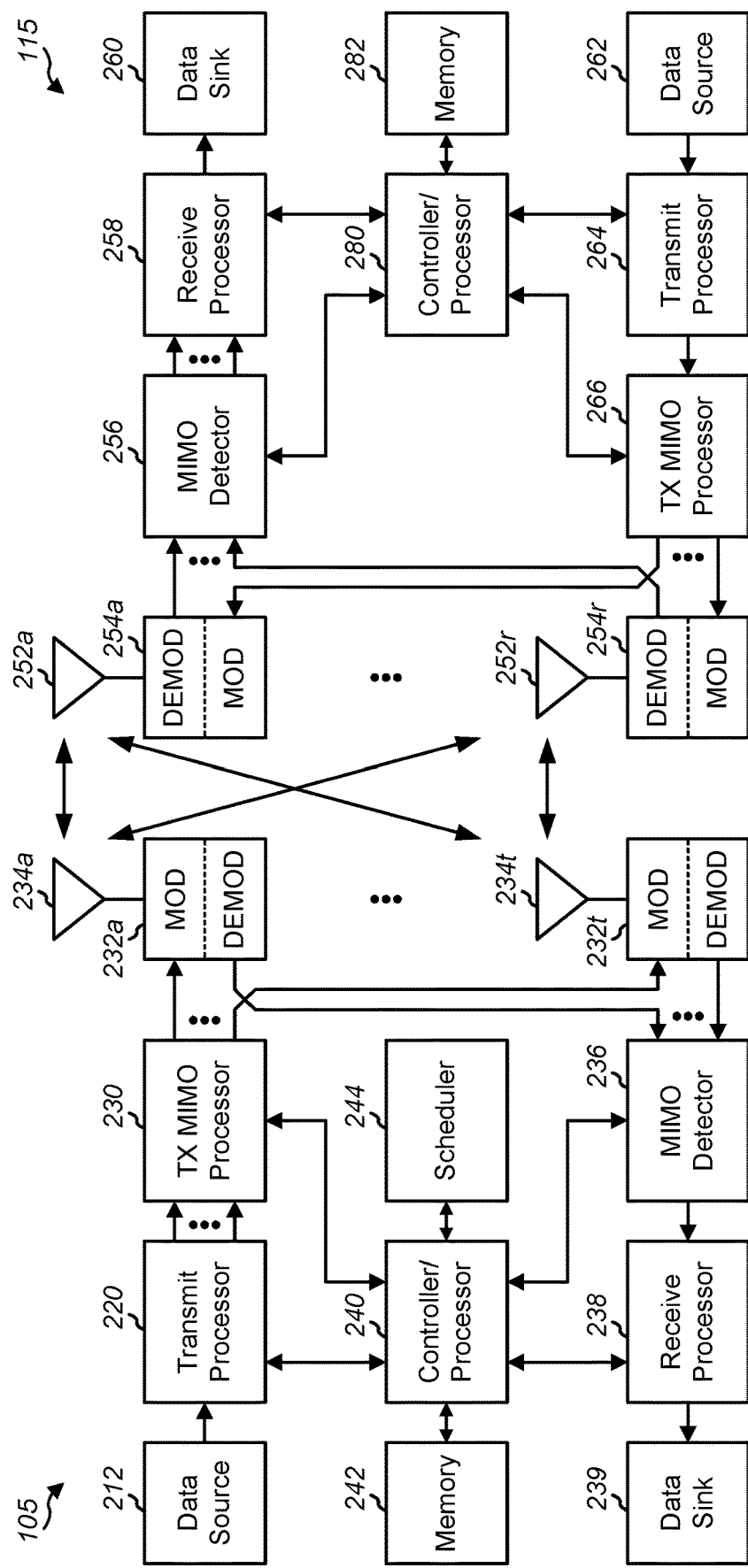
FIG. 2 is a block diagram conceptually illustrating a design of a base station and a UE configured according to some embodiments of the present disclosure.

FIG. 2 shows a block diagram conceptually illustrating an example design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the physical data shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, the antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 4 and 5, and/or other processes for the techniques described herein. Memories 242 and 282 may store data and program codes for base station 105 and UE 115, respectively. Scheduler 244 may schedule UEs for data transmission on the downlink and/or uplink.

Devices of wireless network 100, such as base stations 105 and/or UEs 115, may be configured for beamforming, such as to provide highly directional beams (also known as antenna beams, radiation patterns, and main lobes) used with respect to wireless communication links. For example, base stations 105 and UEs 115 may be configured for robust mmWave transmissions, such as for providing high data rate communications, etc. Accordingly, radio frequency (RF) transceiver components of base station 105 (e.g., transmit processor 220, TX MIMO processor 230, antennas 234a-234t, MODs/DEMODs 232a-232t, MIMO detector 236, and/or receive processor 238) and/or UE 115 (e.g., antennas 252a-252r, MODs/DEMODs 254a-254r, MIMO detector 256, receive processor 258, transmit processor 264 and/or TX MIMO processor 266) of embodiments may be configured for operation with respect to mmWave communications. Embodiments of base station 105 and UE 115 configured for mmWave communications may, for example, implement massive MIMO antenna functionality to provide beamforming for highly directional beams to cope with increased path losses and facilitate line of sight communications.

The use of highly directional beams, such as in association with the above mentioned mmWave wireless communication links, can lead to challenges with respect to establishing and maintaining wireless communication links. For example, although directional beams provide advantages with respect to signal gain and interference avoidance when properly directed to a corresponding communication device (e.g., illuminating an intended, corresponding wireless node), directional beams typically provide a relatively small coverage area. A mobile device may quickly, and often unexpectedly, exit the coverage area of a highly directional beam. Moreover, due to the propagation characteristics of mmWave signals essentially providing line of sight communication links (e.g., diffraction and reflection of propagated signals being less prominent with respect to most materials), signal blockage associated with shadowing and fading may be more prominent than experienced with respect to the lower frequencies of typical cellular communications. Accordingly, communication devices (e.g., base stations 105 and/or UEs 115) of wireless network 100 may implement beam failure recovery (BFR) procedures.

A BFR procedure may, for example, implement a process providing detection of a beam failure, transmission of a beam failure recovery request, response to the beam failure recovery request, identification of a new beam candidate, and implementing the new beam for recovery completion. For example, according to a contention-free random access (CFRA) based BFR procedure, UE 115 may transmit a BFR request signal (e.g., a random access channel (RACH) preamble for BFR) in response to detecting the beam failure. Thereafter, the UE may monitor a PDCCH within random access response (RAR) window (e.g., ra-ResponseWindow) for a signal (e.g., medium access control (MAC) protocol data unit (PDU) addressed to the C-RNTI (cell radio network temporary identifier)) according to the CFRA based BFR procedure. There can, however, be challenges with respect to the timing of initiating beam failure recovery and latency experienced in beam failure recovery completion.

A UE may implement a discontinuous reception (DRX) mode in an attempt to reduce UE power consumption. The UE enters into sleep mode for a certain period of time and wakes up for another period of time when operating according to a DRX mode. During the period of time the UE wakes up in a DRX cycle, the UE monitors for signals relevant to the UE (e.g., paging signals, data transmission signals, etc.). Because the UE's state information may become outdated during the period of time the UE sleeps in a DRX cycle, the UE may perform various operations (e.g., automatic gain control (AGC), time tracking loops (TTL), frequency tracking loops (FTL), channel estimation, etc.) when it exits the sleep state. Performing such a wake up (WU) process often consumes a significant amount of power, and thus performing the WU process according to schedule at a time when no data is actually being received may unnecessarily waste power consumption and shorten the battery life of the UE. Accordingly, a UE may be configured for wakeup signal (WUS) monitoring in association with DRX mode operation. Using a WUS triggered DRX mode, whether the UE wakes up (e.g., WU stage operation is performed) for the ON duration is conditional on the detection of a WUS. Implementation of a WUS triggered DRX mode may thus avoid performing the WU process when no data is actually to be received by the UE.

Figure 3:
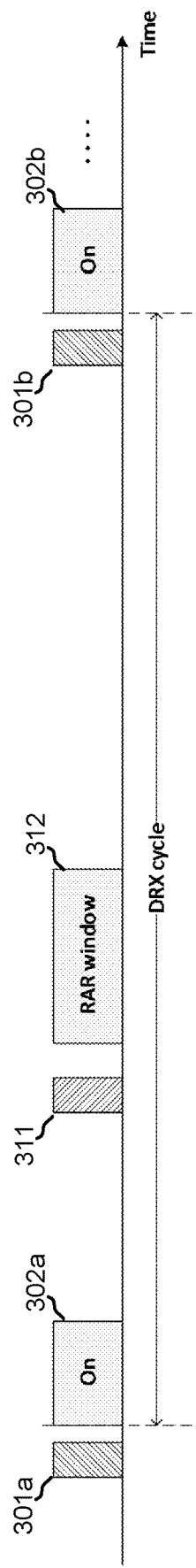
FIG. 3 is a timing diagram illustrating beam failure recovery (BFR) initiated outside a discontinuous reception (DRX) mode active time according to some embodiments of the present disclosure.

As illustrated in FIG. 3, BFR may be triggered outside a DRX mode active time, which may lead to delay in beam failure recovery completion. In the example of FIG. 3, a WUS triggered DRX mode is implemented in which UE 115 is active during the ON duration (e.g., ON duration 302a or 302b) of a respective DRX cycle when the UE detects a WUS occasion (e.g., WUS occasion 301a or 301b) for the DRX cycle. Processing according to a CFRA based BFR procedure (e.g., transmission of a RACH preamble for BFR at BFR request signal transmission occurrence 311 and PDCCH monitoring within RAR window 312) may, however, occur outside of the DRX active times (e.g., ON durations 302a and 302b). For example, UE 115 may detect a beam failure in the time between the active time associated with ON duration 302a ending and transmission of a BFR request signal at BFR request signal transmission occurrence 311, whereby CFRA based BFR procedure processing is initiated outside the DRX active times (e.g., ON durations 302a and 302b). In a situation where latency is experienced between detecting a beam failure and initiating a CFRA based BFR procedure, UE 115 may detect a beam failure during an active time associated with ON duration 302a and the CFRA based BFR procedure processing may nevertheless be initiated outside the DRX active times.

Although the RACH procedure for BFR may be considered to be successfully completed upon detection of a PDCCH addressed to the C-RNTI, the CFRA based BFR procedure may not complete within the time of the RAR window even where a PDCCH addressed to the C-RNTI is detected. For example, the CFRA based BFR procedure may implement further signaling for completing the BFR. UE 115 may receive BFR-related signaling, such as PDCCH transmission configuration indicator (TCI) state activation MAC control elements (CEs), PDSCH TCI state activation MAC CEs, PUCCH/SRS (sounding reference signal) spatial relation activation MAC CE(s), path loss (PL) reference signal (RS) update MAC CE, radio resource control (RRC) reconfiguration for P-CSI-RS (periodic channel state information reference signal), etc., for completing BFR. Such BFR-related signaling, such as may be used in updating the beams at the UE, may not be completed within the RAR window. For example, interference and/or other impediments to signal reception may be experienced, whereby retransmission (e.g., according to a hybrid automatic repeat request (HARQ) procedure) is utilized which may fail to complete within the time of the RAR window.

As should be appreciated from the foregoing, there may be situations where the BFR-related signaling is not completed in the RAR window and the UE may still need to receive further information (e.g., from base station 105) beyond the time of the RAR window in order to complete the BFR. In operation according to existing 5G NR protocols, the RAR window (e.g., ra-ResponseWindow) is not treated as DRX active time. Moreover, according to existing 5G NR protocols, there is no "Random Access Response" for BFR (e.g., any instance of a PDCCH addressed to the C-RNTI detected during the RAR window, after transmission of a RACH preamble for BFR, may complete the RACH procedure). Thus, for BFR, the signal addressed to C-RNTI (e.g., MAC PDU scheduled by the PDCCH addressed to C-RNTI) received during an RAR window outside of an DRX active time (e.g., RAR window 312) does not trigger any active time of the DRX mode. For example, under existing 5G NR protocols, the DRX inactivity timer, round trip time (RTT) timer, and re-transmit (re-Tx) timer are triggered only when the MAC PDU is received during a DRX active time or by a MAC PDU received/transmitted according to SPS/CG (semi-persistent scheduling configured grant). In contrast, for CFRA other than for BFR, DRX active time follows after RAR reception.

In situations where BFR is triggered outside DRX active time and the UE may need to receive further information to complete the BFR beyond the time of the RAR window, RAR window is not extended (e.g., by DRX inactivity/re-Tx timers) according to the DRX mode operation. A UE's opportunities to receive further information from a base station is restricted to the RAR window and active times of subsequent DRX cycles (e.g., an ON duration of the next DRX cycle). In the example of FIG. 3, if the BFR-related signaling for completing BFR is not successfully received by UE 115 implementing a CFRA based BFR procedure within RAR window 312, a next potential opportunity for receiving the BFR-related signaling would occur during ON duration 302b of the next DRX cycle. This DRX active time may not follow immediately after RAR window 312 (e.g., initiating only after the inactivity period between the end of RAR window 312 and the beginning of ON duration 302b) in light of the BFR procedure having been triggered outside the DRX active time. When the UE fails in receiving/transmitting MAC PDUs, HARQ retransmission may be interrupted. Additionally or alternatively, the UE may need to receive other BFR-related signaling (e.g., PDCCH TCI state activation MAC CE(s), PDSCH TCI state activation MAC CE(s), PUCCH/SRS spatial relation activation MAC CE(s), PL RS update MAC CE, RRC reconfiguration for P-CSI-RS, etc.) from the network to complete the BFR procedure. If these cannot be done in relative temporal proximity to triggering BFR, the performance (e.g., BFR procedure performance, performance of communication relying on the associated beams, etc.) will likely be adversely impacted.

The foregoing issues with respect to completing a BFR procedure may be compounded if the UE is configured with WUS monitoring. For example, the beam for WUS is not updated immediately after triggering BFR. Accordingly, the UE may not be able to receive WUS for the next DRX cycles even though the base station transmits WUS, and the DRX active time (e.g., ON duration 302b) for one or more subsequent DRX cycles would never start.

A potential implementation based solution for facilitating completing a CFRA based BFR procedure may include configuring the UE so that the UE triggers BFR only during a DRX active time. Although such a solution may work well when WUS is not configured (e.g., the UE is implementing a legacy DRX mode), the solution may not be particularly well suited for use in situations where the UE is configured for WUS. For example, if WUS is configured, the UE cannot autonomously start its ON duration (e.g., start drx-onDurationTimer) and thus the UE would wait until the WUS triggers DRX active time. However, as noted above, once beam failure is detected, the UE may not be able to receive the WUS and thus initiating a DRX active time may become problematic. Similarly, any solution relying upon a WUS configured UE continuing to monitor PDCCH in the BFR search space (e.g., frequency resources, time resources, beam configuration, spatial filter, etc.) set in a subsequent DRX ON duration may present issues with respect to the inability of the UE to autonomously start its ON duration.

Another potential implementation based solution for facilitating completing a CFRA based BFR procedure may include configuring the UE with a very long RAR window (e.g., in accordance with current protocols, the RAR window can be up to 10 ms for licensed band operation and 40 ms for unlicensed band operation). For example, after MAC PDU addressed to the C-RNTI is monitored in the PDCCH, the UE may continue monitoring C-RNTI in the BFR search space set for the remaining time of the RAR window. RAR window configuration, however, is up to the network (e.g., the network operator associated with the particular base station then in communication with the UE). Various networks may be configured for relatively short RAR windows for any number of reasons. A solution relying upon the RAR window configuration may thus provide inconsistent, unpredictable, and otherwise unsatisfactory operation with respect to completing a CFRA based BFR procedure.

Techniques to enable and provide BFR operation for DRX modes with WUS monitoring are provided according to aspects of the present disclosure. In accordance with aspects of the disclosure, DRX mode operation may be altered based on the CFRA based BFR procedure implemented by the UE. For example, DRX mode operation may be altered for allowing a UE to start a DRX active time after a BFR procedure is triggered by transmitting a BFR request signal. In another example, DRX mode operation may be altered for allowing a UE to start an ON duration timer for a next DRX cycle after a BFR procedure is triggered by transmitting a BFR request signal. In still another example, DRX mode operation may be altered for allowing a UE to monitor a BFR search space set regardless of DRX status, after a BFR procedure is triggered by transmitting a BFR request signal.

FIG. 4 shows an example flow providing functionality invoked by a UE for altering DRX mode operation based on a CFRA based BFR procedure implemented by a UE. For example, the functionality of flow 400 may be utilized with respect to beam failure recovery initiated, triggered, or otherwise implemented outside a DRX mode active time. Flow 400 illustrated in FIG. 4, for example, may be implemented as part of a procedure to recover after beam failure by UE 115 according to some aspects of the present disclosure. In some implementations, flow 400 comprises various functionality as may be performed by logic (e.g., logic circuits of controller/processor 280) of embodiments of UE 115 to facilitate BFR completion irrespective of a beam failure being detected within or outside of a DRX active time, in accordance with concepts of the present disclosure.

In operation according to flow 400 of the illustrated embodiment, a beam failure is detected by a UE operating according to a DRX mode at block 401. For example, a beam failure with respect to a control information and/or application data channel may be detected. In accordance with some aspects, a communication failure may be detected by UE 115, such as by receive processor 258 reporting a failure to recover data, an unacceptably high bit error rate (BER) with respect to received data, etc. to controller/processor 280, whereby logic of controller/processor 280 determines that beam failure has occurred. As discussed above with reference to FIG. 3, in some examples, UE 115 may detect a beam failure in the time between the active time associated with an ON duration ending and transmission of a BFR request signal, whereby CFRA based BFR procedure processing is initiated outside the DRX active times. Also as discussed above with reference to FIG. 3, in some examples, UE 115 may detect a beam failure during an active time associated with an ON duration and the CFRA based BFR procedure processing may nevertheless be initiated outside the DRX active times.

Although BFR completion is facilitated for situations in which CFRA based BFR procedure processing is initiated outside of the DRX active times through operation according to flow 400 of the illustrated example, functions of the illustrated flow may nevertheless be performed according to some aspects of the disclosure irrespective of CFRA based BFR procedure processing being initiated within or outside of a DRX active time. Accordingly, in some examples, UE 115 may detect a beam failure in a DRX active time (e.g., an ON duration), whereby CFRA based BFR procedure processing is initiated within the DRX active time.

At block 402, a BFR request signal is transmitted according to a CFRA based BFR procedure implemented by the UE in response to detecting the beam failure. For example, CFRA based BFR procedure processing may be initiated whereby RF transceiver components of UE 115 (e.g., antennas 252a-252r, MODs/DEMODs 254a-254r, MIMO detector 256, receive processor 258, transmit processor 264 and/or TX MIMO processor 266) transmit a BFR request signal. The BFR request signal may, according to some aspects of the present disclosure, comprise a RACH preamble and an associated message of the CFRA based BFR procedure. A BFR request signal may provide an indication of the beam failure, information regarding a new candidate beam configuration for use in further communication with the UE, etc.

DRX mode operation is altered based on the CFRA based BFR procedure implemented by the UE at block 403. For example, DRX control logic of UE 115 may alter DRX mode operation in one or more ways based on the CFRA based BFR procedure to facilitate BFR completion and recovery after beam failure according to aspects of the present disclosure. DRX control logic may, for example, comprise code (e.g., software, firmware, executable instructions, and/or other code elements) stored by memory 282, which when executed by a processor (e.g., controller/processor 280) provides functionality as described herein.

In accordance with some aspects of the disclosure, altering DRX mode operation may comprise starting a DRX active time. For example, DRX mode operation may be altered to allow UE 115 to start a DRX active time after transmitting RACH for BFR (e.g., after the BFR procedure is triggered by transmitting RACH for BFR) or after receiving a PDCCH addressed to C-RNTI in response to the RACH transmission for BFR, irrespective of being within or outside a DRX active time. In operation according to some examples, a DRX timer may be triggered based upon the UE receiving a PDCCH scheduling MAC PDU according to the CFRA based BFR procedure whether or not the UE is operating within an active time of the DRX mode at a time of the UE receiving the PDCCH scheduling MAC PDU. The DRX timer triggered based upon the UE receiving a PDCCH scheduling MAC PDU may, for example, comprise an inactivity timer, a RTT, and/or a re-Tx timer. For example, in operation with respect to a new transmission, a DRX inactivity timer may be triggered, whereas in operation with respect to a retransmission a RTT timer and/or re-TX timer may be triggered. Thus, by receiving a PDCCH addressed to C-RNTI during a RAR window after RACH for BFR, a UE may enter a DRX active time by starting a DRX inactivity timer, RTT timer, and/or re-Tx timer according to some aspects of the disclosure. The DRX active time may extend beyond the period of the RAR window and may be further extended by BFR procedure activity (e.g., further signaling for completing the BFR, HARQ retransmission, etc. triggering a DRX timer).

According to another example, DRX mode operation may be altered such that DRX active time comprises activity of the BFR procedure by the UE. For example, DRX active time can be extended to include the BFR case. In this case, various BFR procedure activity (e.g., BFR request signal transmission, receiving a PDCCH addressed to C-RNTI, receiving further signaling for completing the BFR, HARQ retransmission, etc.) within a RAR window may trigger a DRX timer (e.g., inactivity timer, RTT timer, and/or re-TX timer) and provide DRX active time for BFR completion outside of the RAR window period. As in the earlier example above, the DRX active time may extend beyond the period of the RAR window and may be further extended by BFR procedure activity (e.g., further signaling for completing the BFR, HARQ retransmission, etc. triggering a DRX timer).

In an example where the DRX mode comprises a WUS triggered DRX mode, altering DRX mode operation may comprise altering a spatial filter (e.g., beam configuration) used for receiving a WUS for one or more subsequent DRX cycles (e.g., a next DRX cycle and/or following DRX cycles) after a BFR procedure is triggered by the UE transmitting a BFR request signal, in accordance with some aspects of the disclosure. Accordingly, DRX mode operation may be altered to facilitate a UE starting an ON duration timer for a next DRX cycle after transmitting RACH for BFR. A spatial filter used for receiving the WUS (e.g., where the WUS is not shared by a group of UEs) may, for example, be altered using a quasi-colocation (QCL) assumption of a candidate beam of the CFRA based BFR procedure. In accordance with some aspects of the disclosure, the same QCL as the BFR candidate beam $q_{new}$ (e.g., the same beam used for monitoring the BFR search space set) may be assumed for WUS. A UE may receive WUS for the next (or later) DRX cycle after RACH for BFR, using the new beam (e.g., $q_{new}$), whereby the UE may continue receiving MAC CE for beam update during the active time for the next DRX cycle.

According to another example, DRX mode operation may be altered such that a second (e.g., fallback) resource configuration for the WUS is used. In accordance with some aspects, a second WUS resource configuration (e.g., fallback control resource set, search space set, and/or downlink control information format), if configured, may be used after triggering BFR. The WUS can be configured to be monitored in the BFR search space set (e.g., UE-specific). A UE may assume the same QCL as the candidate beam $q_{new}$ for the second beam configuration used for the WUS.

In accordance with some aspects of the disclosure, altering DRX mode operation with respect to a WUS triggered DRX mode may comprise assuming non-WUS triggered DRX mode operation in which one or more subsequent DRX cycles (e.g., a next DRX cycle and/or following DRX cycles) after transmission of the BFR request signal is initiated with or without the UE receiving the WUS. For example, the WUS triggered DRX mode may be reset after triggering BFR (e.g., after transmission of the BFR request signal by the UE) to DRX mode operation (e.g., legacy DRX mode) which does not utilize WUS to trigger an ON duration. In accordance with some aspects of the disclosure, WUS configuration (e.g., if the UE is configured for WUS triggered DRX mode) may be discarded or temporarily invalidated (e.g., until TCI state update), whereby the UE falls back to legacy DRX operation (e.g., the UE is not required to monitor WUS and operates to start DRX ON duration timer the subsequent DRX cycle irrespective of WUS).

Altering DRX mode operation according to some aspects may comprise monitoring a BFR search space set by the UE after a BFR procedure is triggered by transmitting a BFR request signal whether or not the UE is operating within an active time of the DRX mode. For example, DRX mode operation may be altered to allow UE 115 to monitor a BFR search space set regardless of DRX status. In accordance with some aspects of the disclosure, a UE is enabled to monitor BFR search space after a BFR procedure is triggered by transmitting a BFR request signal (e.g., RACH for a CFRA based BFR procedure) whether or not the UE is operating within a RAR window period and/or an active time of a WUS triggered DRX mode. For example, regardless of DRX status and RAR window, a UE may continue monitoring the BFR search space to facilitate BFR completion (e.g., perform BFR procedure activity, such as signaling for completing the BFR, HARQ retransmission, etc. triggering a DRX timer).

FIG. 5 shows an example flow providing functionality invoked by a base station for altering DRX mode operation based on a CFRA based BFR procedure implemented by a UE. For example, the functionality of flow 500 may be utilized with respect to BFR initiated, triggered, or otherwise implemented outside a DRX mode active time. Flow 500 illustrated in FIG. 5, for example, may be implemented as part of a procedure to recover after beam failure according to some aspects of the present disclosure. In some implementations, flow 500 comprises various functionality as may be performed by logic (e.g., logic circuits of controller/processor 240) of embodiments of base station 105 to facilitate BFR completion irrespective of a beam failure being detected and/or initiated within or outside of a DRX active time, in accordance with concepts of the present disclosure.

In operation according to flow 500 of the illustrated embodiment, a BFR request signal is received according to a CFRA based BFR procedure implemented by a UE, at block 501. For example, CFRA based BFR procedure processing may be initiated whereby RF transceiver components of base station 105 (e.g., antennas 234a-234t, MODs/DEMODs 232a-232t, MIMO detector 236, receive processor 238, transmit processor 220 and/or TX MIMO processor 230) receive a BFR request signal. The BFR request signal may, according to some aspects of the present disclosure, comprise a RACH preamble and an associated message of the CFRA based BFR procedure. A BFR request signal may provide an indication of the beam failure, information regarding a beam configuration for use in further communication with the UE, etc. The BFR request signal may be provided in association with beam failure detected by a UE operating according to a DRX mode. In some examples, the BFR request signal may be received in association with a UE initiating the BFR procedure processing outside the DRX active times. In accordance with some examples, the BFR request signal may be received in association with a UE initiating the BFR procedure within a DRX active time.

DRX mode operation is altered based on the CFRA based BFR procedure implemented by the UE at block 502. For example, DRX control logic of base station 105 may alter DRX mode operation in one or more ways based on the CFRA based BFR procedure to facilitate BFR completion and recovery after beam failure by a UE according to aspects of the present disclosure. DRX control logic may, for example, comprise code (e.g., software, firmware, executable instructions, and/or other code elements) stored by memory 240, which when executed by a processor (e.g., controller/processor 240) provides functionality as described herein.

In accordance with some aspects of the disclosure in which the DRX mode comprises a WUS triggered DRX mode, altering DRX mode operation may comprise reconfiguring a beam used for a WUS for a next DRX cycle after a BFR procedure is triggered by a UE transmitting a BFR request signal, in accordance with some aspects of the disclosure. Accordingly, DRX mode operation may be altered to facilitate a UE starting an ON duration timer for a next DRX cycle after transmitting RACH for BFR. A beam used for the WUS (e.g., where the WUS is not shared by a group of UEs) may, for example, be reconfigured using a QCL of a candidate beam of the CFRA based BFR procedure. In accordance with some aspects of the disclosure, the same QCL as the BFR candidate beam $q_{new}$ may be assumed for WUS. The network (e.g., base station 105) may transmit WUS for the next (or later) DRX cycle after RACH for BFR, using the new beam (e.g., $q_{new}$), whereby the UE may continue receiving MAC CE for beam update during the active time for the next DRX cycle.

In accordance with some aspects, a second (e.g., fallback) WUS configuration, if configured, may be used after receiving the BFR request signal. The WUS can be configured to be monitored in the BFR search space set (e.g., UE-specific). A UE may assume the same QCL as the candidate beam $q_{new}$ for the second beam configuration used for the WUS.

In operation according to some aspects of the disclosure, a wireless device may select a particular technique altering DRX mode operation, or a particular combination of techniques altering DRX mode operation, to be implemented. For example, one or a combination of the above mentioned techniques involving starting a DRX active time, altering a spatial filter used for receiving a WUS, assuming non-WUS triggered DRX mode, or monitoring BFR search space irrespective of DRX mode active mode may be selected by a UE depending on an explicit or implicit configuration, operational rule, etc. In accordance with some aspects, selection between implementing a technique involving assuming non-WUS triggered DRX mode and implementing a technique involving monitoring BFR search space irrespective of DRX mode active time may depend on other WUS-related configuration attributes. In one example, if WUS is not configured (e.g., non-WUS triggered DRX mode), a UE may select not to implement any technique altering DRX mode operation (e.g., the UE may instead utilize one or more of the implementation-based solutions described above). In another example, if WUS is configured (e.g., WUS triggered DRX mode), a UE may select to implement a technique involving assuming non-WUS triggered DRX mode or to implement a technique involving monitoring BFR search space irrespective of DRX mode active time (e.g., based upon one or more other WUS configuration parameters, such as ps-Wakeup). In accordance with some aspects, "ps-Wakeup" is a higher layer parameter indicating whether the UE should trigger the DRX ON duration timer when it does not receive a WUS. According to some examples implementing techniques altering DRX mode operation, if ps-Wakeup=true, a UE may select to implement a technique involving assuming non-WUS triggered DRX mode, otherwise the UE may select to implement a technique involving monitoring BFR search space irrespective of DRX mode active time.

Although examples have been described herein with respect to BFR operation for DRX modes with WUS monitoring, it should be appreciated that some aspects of the present disclosure may be implemented in association with BFR procedures with or without WUS monitoring. For example, some aspects of the disclosure may be implemented with respect to BFR procedures which are not WUS triggered. Additionally or alternatively, some aspects of the disclosure may be implemented with respect to BFR procedures other than CFRA based BFR procedures.

Figure 6:
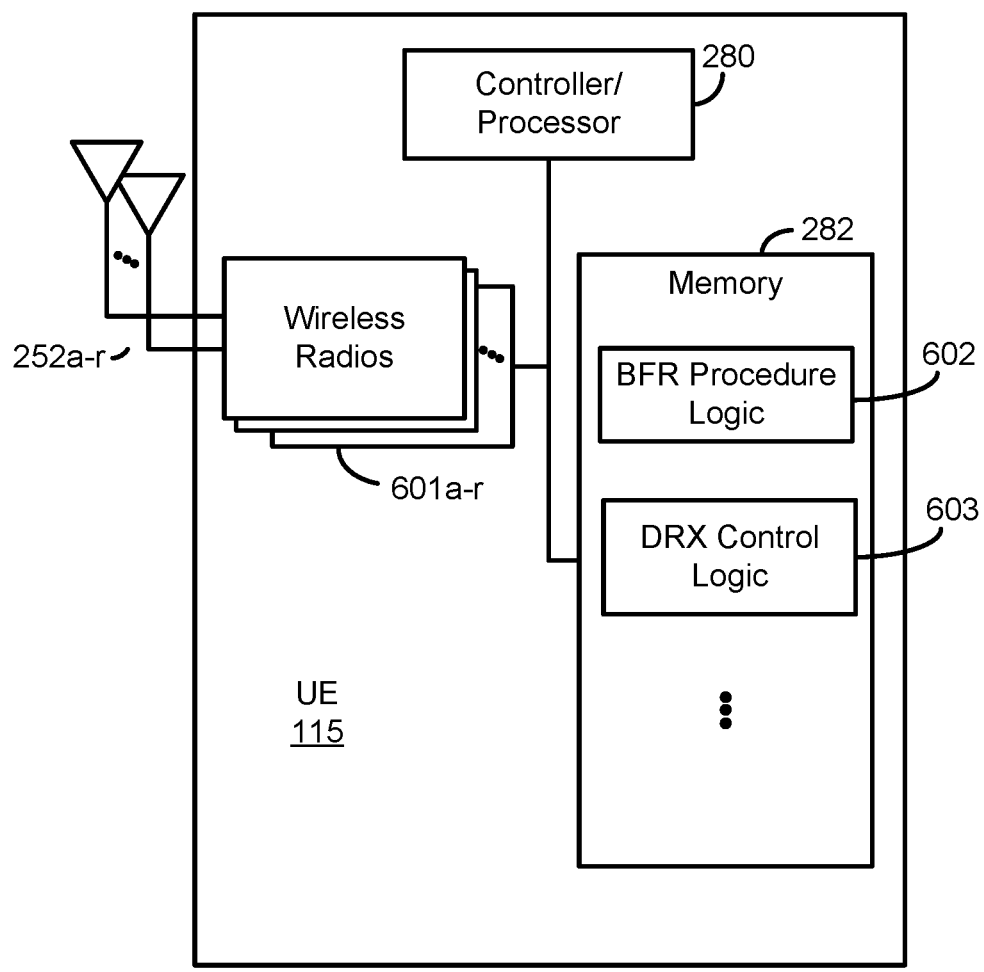
FIG. 6 is a block diagram conceptually illustrating a design of a UE configured to alter DRX mode operation based on a BFR procedure implemented by the UE according to some embodiments of the present disclosure.

FIG. 6 shows a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 601a-r and antennas 252a-r. Wireless radios 601a-r include various components and hardware, as illustrated in FIG. 2 for UE 115, including modulator/demodulators 254a-r, MIMO detector 256, receive processor 258, transmit processor 264, and TX MIMO processor 266.

In the example of FIG. 6, UE 115 includes BFR procedure logic 602, such as may comprise logic for detecting beam failure and/or for performing beam failure recovery processing. BFR procedure logic 602 may, for example, perform functions for detecting beam failure, initiating beam failure recovery, and beam failure recovery completion as discussed above with respect to flow 400 of FIG. 4.

UE 115 shown in FIG. 6 further includes DRX control logic 603, such as may comprise logic for altering DRX mode operation by the UE. DRX control logic 603 may, for example, perform functions for altering DRX mode operation based on a CFRA based BFR procedure implemented by the UE as discussed above with respect to flow 400 of FIG. 4.

Figure 7:
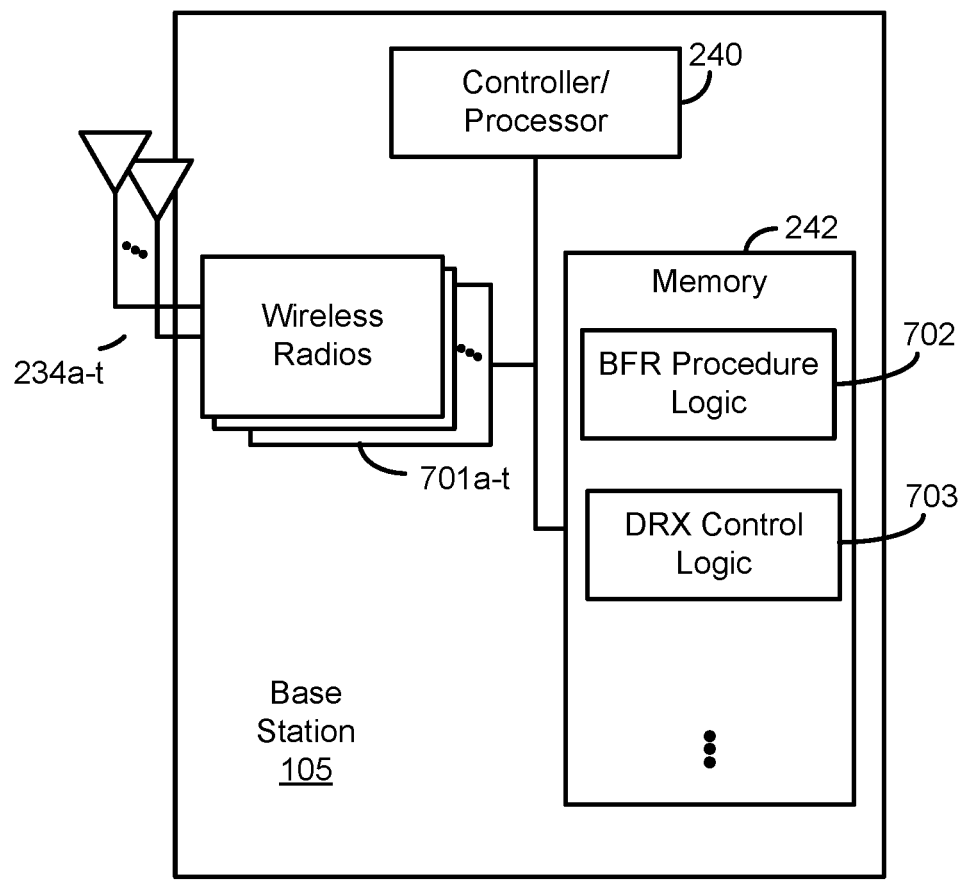
FIG. 7 is a block diagram conceptually illustrating a design of a base station configured to alter DRX mode operation based on a BFR procedure implemented by a UE according to some embodiments of the present disclosure.

FIG. 7 shows a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 701a-t and antennas 234a-t. Wireless radios 701a-t include various components and hardware, as illustrated in FIG. 2 for base station 105, including modulator/demodulators 232a-t, MIMO detector 236, receive processor 238, transmit processor 220, and TX MIMO processor 230.

In the example of FIG. 7, base station 105 includes BFR procedure logic 702, such as may comprise logic for cooperating with a UE in performing beam failure recovery processing. BFR procedure logic 702 may, for example, perform functions for receiving BFR request signals in associating with a UE initiating beam failure recovery as discussed above with respect to flow 400 of FIG. 4.

Base station 105 shown in FIG. 7 further includes DRX control logic 703, such as may comprise logic for altering DRX mode operation by the base station. DRX control logic 703 may, for example, perform functions for altering DRX mode operation based on a CFRA based BFR procedure implemented by the UE as discussed above with respect to flow 500 of FIG. 5.

In some examples of methods, the apparatuses, and articles including non-transitory computer-readable medium described herein, various aspects of altering DRX mode operation based on a CFRA based BFR procedure implemented by the UE may be implemented according to a multiplicity of combinations consistent with concepts described herein. Non-limiting examples of combinations of some aspects of a multi-slot transport block technique are set forth in the example clauses below.

1. Methods, apparatuses, and articles for wireless communication may provide for detecting beam failure by a UE operating according to a DRX mode, transmitting a BFR request signal according to a CFRA based BFR procedure implemented by the UE in response to detecting the beam failure, and altering DRX mode operation based on the CFRA based BFR procedure implemented by the UE.

2. The methods, apparatuses, and articles of clause 1, wherein the BFR request signal comprises a RACH preamble and an associated message of the CFRA based BFR procedure.

3. The methods, apparatuses, and articles of any of clauses 1-2, wherein the altering DRX mode operation provides for starting a DRX active time.

4. The methods, apparatuses, and articles of clause 3, wherein the starting the DRX active time provides for triggering a DRX timer based upon the UE receiving a PDCCH scheduling MAC PDU according to the CFRA based BFR procedure whether or not the UE is operating within an active time of the DRX mode at a time of the UE receiving the PDCCH scheduling MAC PDU.

5. The methods, apparatuses, and articles of any of clauses 3-4, wherein the DRX timer comprises an inactivity timer, a RTT timer, and/or a retransmission timer.

6. The methods, apparatuses, and articles of any of clauses 3-5, wherein the DRX active time comprises an active time of the DRX mode defined to include activity of the BFR procedure by the UE.

7. The methods, apparatuses, and articles of any of clauses 1-6, wherein the DRX mode is a WUS triggered DRX mode.

8. The methods, apparatuses, and articles of clause 7, wherein the altering DRX mode operation provides for monitoring the WUS in a BFR search space set at least for a next DRX cycle after transmission of the BFR request signal by the UE.

9. The methods, apparatuses, and articles of any of clauses 7-8, wherein the altering DRX mode operation provides for altering a spatial filter used for receiving the WUS at least for a next DRX cycle after transmission of the BFR request signal by the UE.

10. The methods, apparatuses, and articles of clause 9, wherein the altering the spatial filter used for receiving the WUS provides for using a QCL assumption of a candidate beam of the CFRA based BFR procedure for the spatial filter used for receiving the WUS.

11. The methods, apparatuses, and articles of any of clauses 9-10, wherein the altering the spatial filter used for receiving the WUS provides for using a second resource configuration for the WUS, wherein the second resource configuration for the WUS is different from a first WUS resource configuration used prior to detecting beam failure.

12. The methods, apparatuses, and articles of clause 11, wherein the second resource configuration for the WUS comprises at least one of a control resource set, a search space set, or a downlink control information format.

13. The methods, apparatuses, and articles of clause 12, wherein the search space set for the WUS is a BFR search space set associated with the CFRA based BFR procedure.

14. The methods, apparatuses, and articles of clause 7, wherein the altering DRX mode operation provides for assuming non-WUS triggered DRX mode operation in which the next DRX cycle after transmission of the BFR request signal is initiated with or without the UE receiving the WUS.

15. The methods, apparatuses, and articles of any of clauses 1-14, wherein the altering DRX mode operation provides for monitoring a BFR search space set by the UE after transmitting the BFR request signal whether or not the UE is operating within an active time of the DRX mode.

16. The methods, apparatuses, and articles of clause 15, wherein the monitoring the BFR search space set by the UE after transmitting the BFR request signal provides for monitoring the BFR search space set by the UE whether or not the UE is operating within a RAR window of the CFRA based BFR procedure.

17. The methods, apparatuses, and articles of any of clauses 1-16, further providing for selecting, by the UE, a particular technique altering DRX mode operation or a particular combination of techniques altering DRX mode operation to be implemented.

18. The methods, apparatuses, and articles of clause 17, wherein the selecting the particular technique altering DRX mode operation or the particular combination of techniques altering DRX mode operation to be implemented is based at least in part on a configuration parameter or an operational rule.

19. Methods, apparatuses, and articles for wireless communication may provide for receiving a BFR request signal according to a CFRA based BFR procedure implemented by a UE, wherein the BFR request signal is provided in association with beam failure detected by the UE operating according to a DRX mode, and altering DRX mode operation based on the CFRA based BFR procedure implemented by the UE.

20. The methods, apparatuses, and articles of clause 19, wherein the DRX mode comprises a WUS triggered DRX mode.

21. The methods, apparatuses, and articles of clause 20, wherein the altering DRX mode operation provides for altering a spatial filter used for the WUS at least for a next DRX cycle after receiving the BFR request signal.

22. The methods, apparatuses, and articles of clause 21, wherein the altering the spatial filter used for the WUS provides for using a QCL assumption of a candidate beam of the CFRA based BFR procedure for the spatial filter used for receiving the WUS.

23. The methods, apparatuses, and articles of clause 21, wherein the altering the spatial filter used for the WUS provides for using a second resource configuration for the WUS, wherein the second resource configuration for the WUS is different from a first WUS resource configuration used prior to detecting beam failure.

24. The methods, apparatuses, and articles of clause 23, wherein the second resource configuration for the WUS comprises at least one of a control resource set, a search space set, or a downlink control information format.

25. The methods, apparatuses, and articles of clause 24, wherein the search space set for the WUS is a BFR search space set associated with the CFRA based BFR procedure.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and modules described herein (e.g., the components, functional blocks, and modules in FIG. 2) may comprise processors, electronics devices, hardware devices, electronics components, logical circuits, memories, software codes, firmware codes, etc., or any combination thereof. In addition, features discussed herein relating to BFR operation for DRX modes may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 4 and 5) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   detecting a beam failure by a user equipment (UE) operating according to a wake-up signal (WUS) triggered discontinuous reception (DRX) mode;
   transmitting a beam failure recovery (BFR) request signal according to a contention-free random access (CFRA) based BFR procedure implemented by the UE in response to detecting the beam failure; and
   altering DRX mode operation to start a DRX active time based on the CFRA based BFR procedure implemented by the UE to facilitate continued WUS triggered DRX mode operation, wherein the DRX active time comprises an active time of the DRX mode configured so that DRX active time is extendable by activity of the BFR procedure by the UE.

2. The method of claim 1, wherein the BFR request signal comprises a random access channel (RACH) preamble and an associated message of the CFRA based BFR procedure.

3. The method of claim 1, wherein starting the DRX active time comprises:
   triggering a DRX timer based upon the UE receiving a physical downlink control channel (PDCCH) scheduling medium access control (MAC) protocol data unit (PDU) according to the CFRA based BFR procedure whether or not the UE is operating within an active time of the DRX mode at a time of the UE receiving the PDCCH scheduling MAC PDU.

4. The method of claim 3, wherein the DRX timer comprises a timer selected from the group consisting of:
   an inactivity timer;
   a round trip time (RTT) timer; and
   a retransmission timer.

5. The method of claim 1, wherein the BFR request signal is transmitted outside active time of the DRX mode according to the CFRA based BFR procedure implemented by the UE.

6. The method of claim 1, wherein the altering DRX mode operation comprises:

monitoring the WUS in a BFR search space set at least for a next DRX cycle after transmission of the BFR request signal by the UE.

7. The method of claim 1, wherein the altering DRX mode operation comprises:
altering a spatial filter used for receiving the WUS at least for a next DRX cycle after transmission of the BFR request signal by the UE.

8. The method of claim 7, wherein the altering the spatial filter used for receiving the WUS comprises:
using a quasi-colocation (QCL) assumption of a candidate beam of the CFRA based BFR procedure for the spatial filter used for receiving the WUS.

9. The method of claim 7, wherein the altering the spatial filter used for receiving the WUS comprises:
using a second resource configuration for the WUS, wherein the second resource configuration for the WUS is different from a first WUS resource configuration used prior to detecting the beam failure.

10. The method of claim 9, wherein the second resource configuration for the WUS comprises at least one of a control resource set, a search space set, or a downlink control information format.

11. The method of claim 10, wherein the search space set for the WUS is a BFR search space set associated with the CFRA based BFR procedure.

12. The method of claim 1, wherein the altering DRX mode operation comprises:
temporarily assuming non-WUS triggered DRX mode operation in which a next DRX cycle after transmission of the BFR request signal is initiated with or without the UE receiving the WUS.

13. The method of claim 1, wherein the altering DRX mode operation comprises:
monitoring a BFR search space set by the UE after the transmitting the BFR request signal whether or not the UE is operating within an active time of the DRX mode.

14. The method of claim 13, wherein the monitoring the BFR search space set by the UE after the transmitting the BFR request signal comprises:
monitoring the BFR search space set by the UE whether or not the UE is operating within a random access response (RAR) window of the CFRA based BFR procedure.

15. An apparatus configured for wireless communication, the apparatus comprising:
a processing system that includes at least one processor and a memory, wherein the processing system is configured to cause the apparatus to:
detect a beam failure by a user equipment (UE) operating according to a wake-up signal (WUS) triggered discontinuous reception (DRX) mode;
transmit a beam failure recovery (BFR) request signal according to a contention-free random access (CFRA) based BFR procedure implemented by the UE in response to detecting the beam failure; and
alter DRX mode operation to start a DRX active time based on the CFRA based BFR procedure implemented by the UE to facilitate continued WUS triggered DRX mode operation, wherein the DRX active time comprises an active time of the DRX mode configured so that DRX active time is extendable by activity of the BFR procedure by the UE.

16. The apparatus of claim 15, wherein the processing system configured to cause the apparatus to alter the DRX mode operation is configured to cause the apparatus to:
start the DRX active time by triggering a DRX timer based upon the UE receiving a physical downlink control channel (PDCCH) scheduling medium access control (MAC) protocol data unit (PDU) according to the CFRA based BFR procedure whether or not the UE is operating within an active time of the DRX mode at a time of the UE receiving the PDCCH scheduling MAC PDU.

17. The apparatus of claim 15, wherein the processing system configured to cause the apparatus to alter the DRX mode operation is configured to cause the apparatus to provide DRX mode operation alteration selected from the group consisting of:
monitor the WUS in a BFR search space set at least for a next DRX cycle after a transmission of the BFR request signal by the UE;
alter a spatial filter used for receiving the WUS at least for the next DRX cycle after the transmission of the BFR request signal by the UE;
use a quasi-colocation (QCL) assumption of a candidate beam of the CFRA based BFR procedure for the spatial filter used for receiving the WUS;
use a second resource configuration for the WUS, wherein the second resource configuration for the WUS is different from a first WUS resource configuration used prior to detecting the beam failure; and
temporarily assume non-WUS triggered DRX mode operation in which the next DRX cycle after the transmission of the BFR request signal is initiated with or without the UE receiving the WUS.

18. The apparatus of claim 15, wherein the processing system configured to cause the apparatus to alter the DRX mode operation is configured to cause the apparatus to:
monitor a BFR search space set by the UE after transmitting the BFR request signal whether or not the UE is operating within an active time of the DRX mode.

19. The apparatus of claim 18, wherein the processing system configured to cause the apparatus to monitor the BFR search space set by the UE after the transmitting the BFR request signal is configured to cause the apparatus to:
monitor the BFR search space set by the UE whether or not the UE is operating within a random access response (RAR) window of the CFRA based BFR procedure.

20. A method of wireless communication, comprising:
receiving a beam failure recovery (BFR) request signal according to a contention-free random access (CFRA) based BFR procedure implemented by a user equipment (UE), wherein the BFR request signal is provided in association with a beam failure detected by the UE operating according to a wake-up signal (WUS) triggered discontinuous reception (DRX) mode; and
altering a spatial filter used for the WUS at least for a next DRX cycle after receiving the BFR request signal based on the CFRA based BFR procedure implemented by the UE to facilitate continued WUS triggered DRX mode operation.

21. The method of claim 20, wherein the altering the spatial filter used for the WUS comprises:
using a quasi-colocation (QCL) assumption of a candidate beam of the CFRA based BFR procedure for the spatial filter used for receiving the WUS.

22. The method of claim 20, wherein the altering the spatial filter used for the WUS comprises:
using a second resource configuration for the WUS, wherein the second resource configuration for the WUS is different from a first WUS resource configuration used prior to detecting the beam failure.

23. The method of claim 22, wherein the second resource configuration for the WUS comprises at least one of a control resource set, a search space set, or a downlink control information format.

24. The method of claim 23, wherein the search space set for the WUS is a BFR search space set associated with the CFRA based BFR procedure.

25. An apparatus configured for wireless communication, the apparatus comprising:
a processing system that includes at least one processor and a memory, wherein the processing system is configured to cause the apparatus to:
receive a beam failure recovery (BFR) request signal according to a contention-free random access (CFRA) based BFR procedure implemented by a user equipment (UE), wherein the BFR request signal is provided in association with a beam failure detected by the UE operating according to a wake-up signal (WUS) triggered discontinuous reception (DRX) mode; and
alter a spatial filter used for the WUS at least for a next DRX cycle after receiving the BFR request signal based on the CFRA based BFR procedure implemented by the UE to facilitate continued WUS triggered DRX mode operation.

26. The apparatus of claim 25, wherein the processing system configured to cause the apparatus to alter the spatial filter is configured to cause the apparatus to provide DRX mode operation alteration selected from the group consisting of:
use a quasi-colocation (QCL) assumption of a candidate beam of the CFRA based BFR procedure for the spatial filter used for receiving the WUS; and
use a second resource configuration for the WUS, wherein the second resource configuration for the WUS is different from a first WUS resource configuration used prior to detecting the beam failure.

* * * * *